(12) United States Patent
MacKinnon et al.

(10) Patent No.: US 8,030,405 B2
(45) Date of Patent: *Oct. 4, 2011

(54) BLENDED PEM'S WITH ELASTOMERS FOR IMPROVED MECHANICAL DURABILITY

(75) Inventors: Sean M MacKinnon, Fairport, NY (US); Timothy J. Fuller, Pittsford, NY (US); Michael R. Schoeneweiss, W. Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

This patent is subject to a terminal disclaimer.

(21) Appl. No.: 12/434,761

(22) Filed: May 4, 2009

(65) Prior Publication Data

US 2009/0280383 A1   Nov. 12, 2009

Related U.S. Application Data

(60) Provisional application No. 61/052,151, filed on May 9, 2008.

(51) Int. Cl.
*C08L 27/12* (2006.01)
(52) U.S. Cl. ............... 525/199; 525/200; 525/326.2; 526/250; 526/252; 526/253; 526/254
(58) Field of Classification Search .......... 525/199, 525/200, 326.2; 526/250, 252, 253, 254
See application file for complete search history.

(56) References Cited

U.S. PATENT DOCUMENTS

| 5,006,408 A * | 4/1991 | Green et al. ............... 428/395 |
| 5,021,602 A | 6/1991 | Clement et al. |
| 5,037,917 A | 8/1991 | Babb et al. |
| 5,066,746 A | 11/1991 | Clement et al. |
| 5,159,037 A | 10/1992 | Clement et al. |
| 5,159,038 A | 10/1992 | Babb et al. |
| 5,910,378 A | 6/1999 | Debe et al. |
| 6,124,060 A | 9/2000 | Akita et al. |
| 6,183,668 B1 | 2/2001 | Debe et al. |
| 6,277,512 B1 | 8/2001 | Hamrock et al. |
| 6,384,167 B2 | 5/2002 | DesMarteau et al. |
| 6,444,343 B1 | 9/2002 | Prakash et al. |
| 6,523,699 B1 | 2/2003 | Akita et al. |
| 6,559,237 B1 | 5/2003 | Mao et al. |
| 6,847,518 B2 | 1/2005 | Fukuda et al. |
| 6,875,537 B2 | 4/2005 | Tani et al. |
| 6,926,984 B2 | 8/2005 | Asano et al. |
| 6,933,068 B2 | 8/2005 | Asano et al. |

(Continued)

FOREIGN PATENT DOCUMENTS

JP     2003535929 T     12/2003

(Continued)

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

(Continued)

*Primary Examiner* — Bernard Lipman
(74) *Attorney, Agent, or Firm* — Brooks Kushman P.C.

(57) ABSTRACT

A blend composition comprises a fluorine-containing polymer electrolyte and a fluoro-rubber. An electrolyte membrane may be prepared from the blend composition. The electrolyte membrane may be used in electrochemical cells such as electrolyzers, batteries and fuel cells.

19 Claims, 2 Drawing Sheets

U.S. PATENT DOCUMENTS

| | | | |
|---|---|---|---|
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1 | 1/2008 | Maier et al. | |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

"Fluorel Technical Data Sheets," MatWeb Material Property Data website, http://www.matweb.com/search/GetMatIsByTradename.aspx?navletter=F&tn=Fluorel%E2%84%A2, copyright 1996-2010, 1 pg.

Nafion perfluorinated resin, Sigma-Aldrich Online Catalog, http://www.sigmaaldrich.com/catalog/ProductDetail.do?lang=en&N4=495786|ALDRICH&N5=SEARCH_CONCAT_PNO|BRAND_KEY&F=SPEC, copyright 2010, 1 pg.

* cited by examiner

BLENDED PEM'S WITH ELASTOMERS FOR IMPROVED MECHANICAL DURABILITY

CROSS-REFERENCE TO RELATED APPLICATIONS

This application claims the benefit of U.S. provisional application Ser. No. 61/052,151, filed May 9, 2008.

TECHNICAL FIELD

The field to which the disclosure generally relates includes polymer electrolytes, electrolyte membranes and fuel cells.

BACKGROUND

A polymer electrolyte can be readily processed into a thin membrane, which is useful as a separator and ionic conductor in electrochemical cells. Polymer electrolyte membranes have been used in electrolysis, batteries and fuel cells. To further increase the current density and energy density in an electrochemical cell, a polymer electrolyte with high ionic conductivity and ion exchange capacity is desired. Polymer electrolytes with high ion exchange capacity, however, typically suffer from poor mechanical properties, especially at high relative humidity. Some of the hydrocarbon electrolytes and perfluoropolymer electrolytes also suffer from mechanical degradation after many repeated humidity cycles leading to irrecoverable performance losses. Incorporating a reinforcing nonionic polymer into a polymer electrolyte results in lower ion exchange capacity. As the nonionic polymer is not usually compatible with a polymer electrolyte, a blend of nonionic polymer with a polymer electrolyte may have inferior mechanical properties.

Accordingly, there is a need to improve the mechanical properties of a polymer electrolyte membrane without compromising its electrochemical performance.

SUMMARY OF EXEMPLARY EMBODIMENTS OF THE INVENTION

The present invention solves one or more problems of the prior art by providing in at least one embodiment a polymer blend. The polymer blend comprises a first polymer that includes a cyclobutyl moiety and a non-ionic fluorine-containing polymer. The first polymer that includes a cyclobutyl moiety and the non-ionic fluorine-containing polymer may be configured to form an intimate blend, which is used to form an electrolyte membrane. A membrane electrode assembly and a fuel cell may be prepared from the electrolyte membrane. Moreover, electrochemical cells such as electrolyzers and batteries may also utilize the electrolyte membrane of this embodiment.

In another embodiment of the present invention, a polymer blend is provided. The polymer blend includes an ionic polymer blend, which includes an ionic polymer having a cyclobutyl moiety and an ionic moiety that does not contain a cyclobutyl moiety. The polymer blend further comprises a non-ionic fluorine-containing polymer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
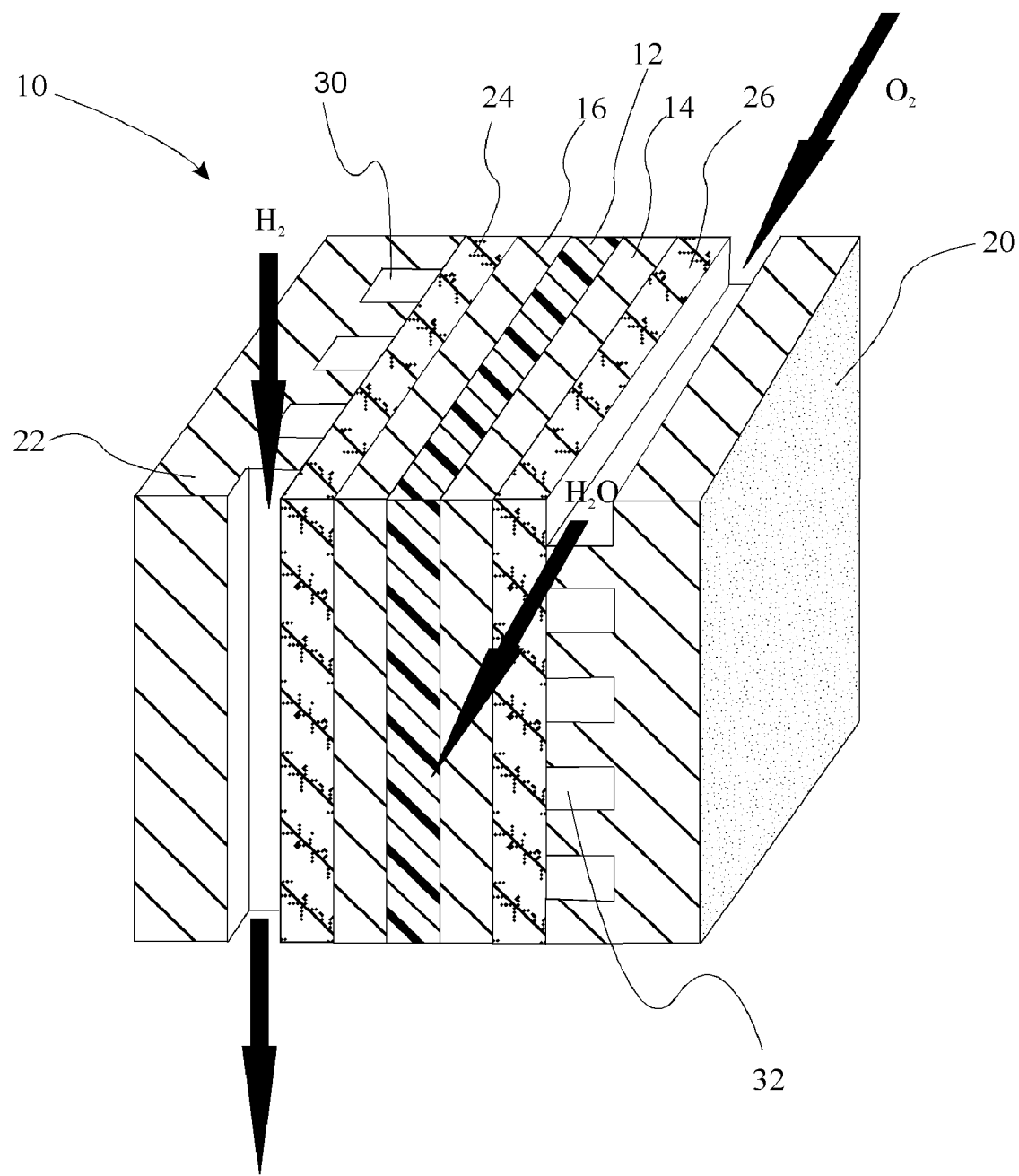
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 30 and 32, and gas diffusion layers 24 and 26.

In an embodiment of the present invention, an ion conducting polymer blend suitable for fuel cell applications is provided. The polymer blend of this embodiment includes a first polymer that includes a cyclobutyl moiety and a non-ionic fluorine-containing polymer (i.e., a fluoro-rubber). Advantageously, the blend composition may be cast into an electrolyte membrane that can be used to prepare electrochemical cells such as electrolyzers, batteries and fuel cells. In one refinement, the first polymer includes one or more of the following protogenic functional groups: —$SO_3H$, $COOH$, $PO_3R_{12}H$, and combinations thereof where $R_{12}$ is H, aryl, phenyl, methyl, ethyl, propyl, butyl, and pentyl.

In one refinement of the present embodiment, the first polymer is present in an amount from about 1 to about 95 weight percent of the total weight of the polymer blend. In another refinement, the first polymer is present in an amount from about 25 to about 85 weight percent of the total weight of the polymer blend. In another refinement, the first polymer is present in an amount from about 30 to about 70 weight percent of the total weight of the polymer blend. In another refinement, the first polymer is present in an amount from about 5 to about 95 weight percent of the total weight of the polymer blend. In still another refinement, the fluoro-rubber is present in an amount from about 20 to about 99 weight percent of the total weight of the polymer blend. In yet another refinement, the fluoro-rubber is present in an amount from about 50 to about 95 weight percent of the total weight of the polymer blend. In still another refinement, the fluoro-rubber is present in an amount from about 30 to about 90 weight percent of the total weight of the polymer blend. In still another refinement, the fluoro-rubber is present in an amount from about 5 to about 95 weight percent of the total weight of the polymer blend.

The first polymer that includes a cyclobutyl moiety may be any such polymer with sufficient ionic conductivity and ion exchange capacity. The first polymer that includes a cyclobutyl moiety may comprise aliphatic or aromatic fluorine containing structure segments that are stable in a wide temperature range and in the harsh chemical environment of an electrochemical cell. The fluorine containing chemical structure also facilitates favorable interaction with the fluoro-rubber in the blend composition for uniform and intimate mixing. The first polymer that includes a cyclobutyl moiety also comprises an ionic group to provide ionic conductivity and ion exchange capacity. The ionic group may comprise, for example, a hydrocarbon based or fluorocarbon based carboxylic acid, sulfonic acid, sulfonamide, phosphonic acid and their salts. The ionic conductivity of the polymer electrolyte may range from 0.001 Siemen/cm to about 10 Siemen/cm. In one variation, the polymer electrolyte is a copolymer comprising at least one hydrophilic ionic segment and one fluorine containing hydrophobic segment.

In a further refinement of the present embodiment, the first polymer that includes a cyclobutyl moiety has an ion exchange capacity (IEC) greater than about 0.2 meq/gram (miliequivalent per gram), or preferably, between about 0.5 meq/gram and 4 meq/gram. IEC of a known polymer structure may be calculated by simply dividing the number of sulfonic acid groups per repeating monomer unit by the formula weight of the repeating monomer unit, and multiplying the result by 1000. For polymer electrolyte with unknown degree of sulfonation, IEC can be determined experimentally. The experiment method used here to determine IEC value takes a measured weight of dried polymer electrolyte solid or membrane, and calculates an acid molar equivalent based on the first inflection point of a titration curve near pH 7. Specifically, an electrolyte sample is dried in an oven at about 80° C., optionally under vacuum. After the dried sample is allowed to cool to room temperature in a capped container, the sample is quickly weighed into a titration cup. The sample of known dry weight is then allowed to soak in the titration cup in deionized water before a measured amount of NaCl solution (typically 2.0N concentration) is added. The NaCl solution exchanges out the proton ions in the electrolyte to turn the soaking solution acidic. A NaOH solution (typically 0.01N concentration) is used to titrate the NaCl soak solution to pH 7 to determine the amount of proton ions exchanged out of the electrolyte. The molar equivalent of the proton in the solution is then divided by the dry weight of the electrolyte sample, and multiplied by 1000 to yield the IEC value of the sample.

As set forth above, the first polymer includes cyclobutyl moeity. Suitable polymers having cyclobutyl moieties are disclosed in U.S. Pat. Pub. No. 20070099054, the entire disclosure of which is hereby incorporated by reference. In variation of the present invention, the first polymer comprises polymer segments 1 and 2:

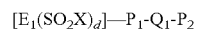  1

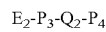  2 wherein:

$E_1(SO_2X)_d$ is a sulfonated aromatic containing moiety;

$E_1$ is an aromatic containing moiety;

$E_2$ is an unsulfonated aromatic-containing and/or aliphatic-containing moiety;

X is an —OH, a halogen, an ester, or

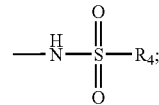

d is the number of $(SO_2X)_d$ attached to $E_1$. In one refinement, d is equal to the number of aromatic rings in $E_1$. In another refinement, each aromatic ring in $E_1$ can have 0, 1, 2, 3, or 4 $SO_2X$ groups;

$P_1$, $P_2$, $P_3$, $P_4$ are each independently: absent, —O—, —S—, —SO—, —CO—, —$SO_2$—, —$NR_1H$—, $NR_2$—, or —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

In another variation of the present embodiment, the first polymer comprises segments 3 and 4:

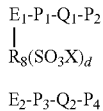  (3)

(4)
$E_2\text{-}P_3\text{-}Q_2\text{-}P_4$ wherein:
$E_1$, $E_2$ are each independently an aromatic-containing and/or aliphatic-containing moiety;
X is an —OH, a halogen, an ester, or

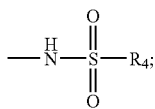

d is the number of $(SO_2X)_d$ attached to $E_1$. In one refinement, d is equal to the number of aromatic rings in $E_1$. In another refinement, each aromatic ring in $E_1$ can have 0, 1, 2, 3, or 4 $SO_2X$ groups. In still another refinement, d is an integer from 1 to 4 on average;
$P_1$, $P_2$, $P_3$, $P_4$ are each independently: absent, —O—, —S—, —SO—, —CO—, —SO_2—, —NH—, $NR_2$—, or —$R_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_8(SO_3X)_d$ is a sulfonated aliphatic or aromatic containing moiety. In a refinement, $R_8$ is $C_{1-25}$ alkylene, $C_{1-25}$ perfluoroalkylene, perfluoroalkyl ether, alkylether, or $C_{1-25}$ arylene; and
$Q_1$, $Q_2$ are each independently a fluorinated cyclobutyl moiety.

In another variation of the present embodiment, the first polymer comprises segments 5 and 6:

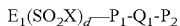  5

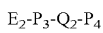  6 connected by a linking group $L_1$ to form polymer units 7 and 8:

  7

  8 wherein:
$E_1(SO_2X)_d$ is a sulfonated aromatic-containing moiety;
$E_2$ is an unsulfonated aromatic-containing and/or aliphatic-containing moiety;
$L_1$ is a linking group;
X is an —OH, a halogen, an ester, or

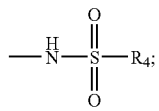

d is a number of $(SO_2X)$ functional groups attached to $E_1$;
$P_1$, $P_2$, $P_3$, $P_4$ are each independently absent, —O—, —S—, —SO—, —SO_2—, —CO—, —NH—, $NR_2$—, —$R_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing the repetition of polymer segment 1. Typically, i is from 1 to 200; and,
j is a number representing the repetition of a polymer segment 2. Typically, j is from 1 to 200.

In still another variation of the present embodiment, the first polymer comprises polymer segments 9 and 10:

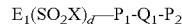  9

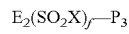  10 wherein:
$E_1$, $E_2$ is an aromatic or aliphatic-containing moiety wherein at least one of $E_1$ and $E_2$ include an aromatic group substituted with —$SO_2X$;
X is an —OH, a halogen, an ester, or

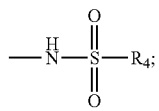

d is the number of $(SO_2X)$ functional groups attached to $E_1$;
In one refinement, d is equal to the number of aromatic rings in $E_1$. In another refinement, each aromatic ring in $E_1$ can have 0, 1, 2, 3, or 4 $SO_2X$ groups. In still another refinement, d is an integer from 1 to 4 on average;
f is the number of $(SO_2X)$ functional groups attached to $E_2$;
In one refinement, f is equal to the number of aromatic rings in $E_2$. In another refinement, each aromatic ring in $E_2$ can have 0, 1, 2, 3, or 4 $SO_2X$ groups. In still another refinement, f is an integer from 1 to 4 on average;
$P_1$, $P_2$, $P_3$ are each independently absent, —O—, —S—, —SO—, —SO_2—, —CO—, —NH—, $NR_2$—, —$R_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero d is zero.

Example for Q1 and Q2 in the above formulae are:
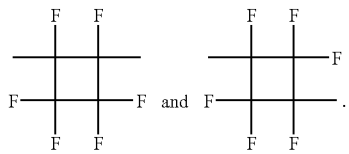
In each of the formulae 1-10, $E_1$ and $E_2$ include one or more aromatic rings. For example, $E_1$ and $E_2$, include one or more of the following moieties:
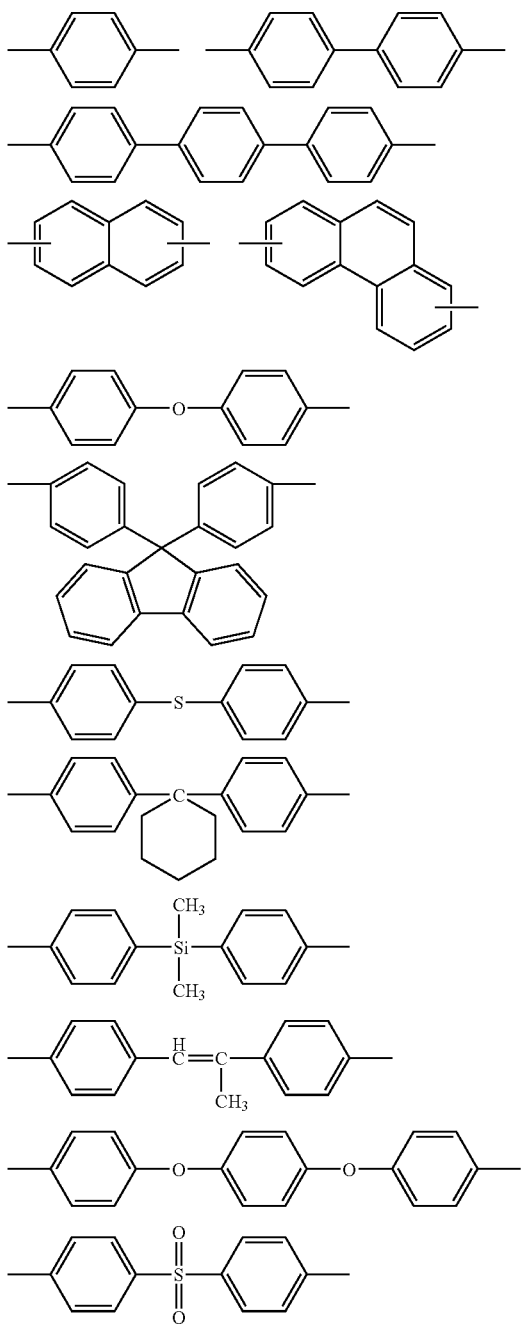
-continued
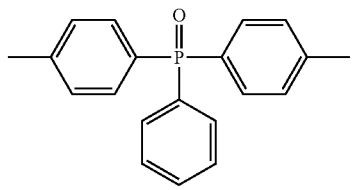
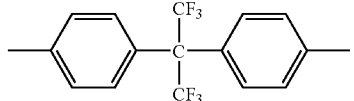
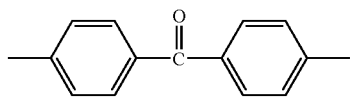
Examples of $L_1$ include the following linking groups:
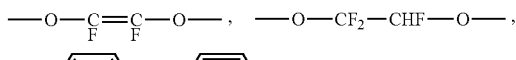
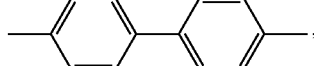
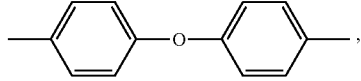
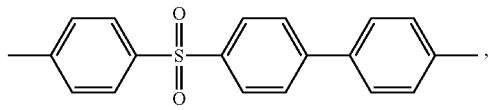
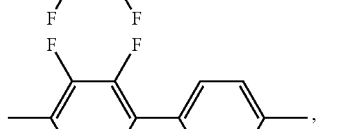
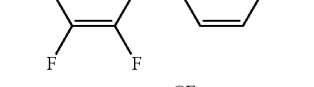
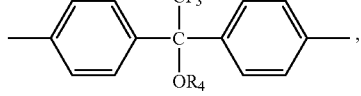
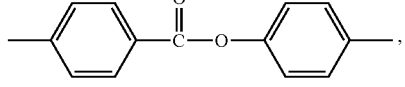
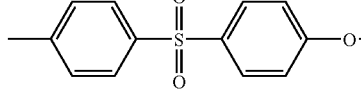
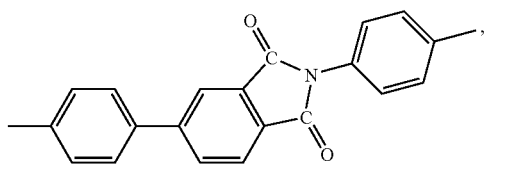

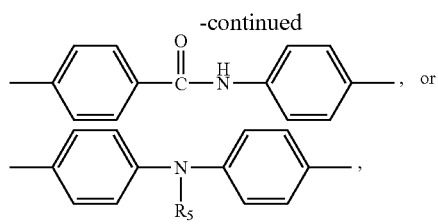

where R₅ is an organic group, such as an alkyl or acyl group.

The non-ionic fluorine-containing polymer (the fluoro-rubber) may be any rubber material comprising fluorine atoms. The fluoro-rubber may comprise a fluoropolymer having a glass transition temperature below about 25° C. or preferably, below 0° C. The fluoro-rubber may exhibit an elongation at break in a tensile mode of at least 50% or preferably at least 100% at room temperature. The fluoro-rubber is generally hydrophobic and substantially free of ionic group. The fluoro-rubber polymer chain may have favorable interaction with the first polymer that includes a cyclobutyl moiety described above. Such favorable interaction may facilitate formation of a stable, uniform and intimate blend of the two materials. The fluoro-rubber may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-rubber may also be prepared by copolymerizing at least one fluoro-monomer and at least one non-fluoro-monomer such as ethylene, propylene, methyl methacrylate, ethyl acrylate, styrene and the like. The fluoro-rubber may be prepared by free radical polymerization or anionic polymerization in bulk, emulsion, suspension and solution. Examples of fluoro-rubbers include poly(tetrafluoroethlyene-co-ethylene), polyvinylidene difluoride, poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-rubbers are commercially available from Arkema under trade name Kynar Flex, from Solvay Solexis under the trade name Technoflon®, from 3M under the trade name Dyneon®, and from DuPont under the trade name Viton®. For example, Kynar Flex 2751 is a copolymer of vinylidene fluoride and hexafluoropropylene with a melting temperature between about 130° C. and 140° C. The glass transition temperature of Kynar Flex 2751 is about −40 to −44° C. The fluoro-rubber may further comprise a curing agent to allow crosslinking reaction after blended with a first polymer that includes a cyclobutyl moiety:

| Grade | Form | Melt Temperature, C. |
|---|---|---|
| Kynar Superflex 2500-20 | pellet | 117-125 |
| Kynar Flex 2750-01 | pellet | 130-138 |
| Kynar Flex 2751-00 | powder | 130-138 |
| Kynar Flex 2950-05 | pellet | 130-138 |
| Kynar Flex 2800-00 | pellet | 140-145 |
| Kynar Flex 2801-00 | powder | 140-145 |
| Kynar Flex 2900-04 | pellet | 140-145 |
| Kynar Flex 2800-20 | pellet | 140-145 |
| Kynar Flex 2821-00 | powder | 140-145 |
| Kynar Flex 2850-00 | pellet | 155-160 |
| Kynar Flex 2851-00 | powder | 155-160 |
| Kynar Flex 2850-04 | pellet | 155-160 |
| Kynar Flex 3120-10 | pellet | 161-168 |
| Kynar Flex 3121-10 | powder | 161-168 |
| Kynar Flex 3120-50 | pellet | 161-168 |
| Kynar Flex 3121-50 | powder | 161-168 |

The first polymer that includes a cyclobutyl moiety and the fluoro-rubber may be blended together to form a blend composition using any polymer blending methods. The first polymer that includes a cyclobutyl moiety and the fluoro-rubber may be heated to a sufficiently high temperature to form a polymer melt and mixed in their molten state in a reactor, an extruder or in melt film casting equipment. The first polymer that includes a cyclobutyl moiety and the fluoro-rubber may be dissolved in an organic solvent or a solvent mixture to form a mixture in solution. The solvent is subsequently evaporated or washed away in a film casting process, resulting in a membrane of the blend composition. Alternatively, the fluoro-rubber may be dissolved in a solvent that is capable of swelling but not dissolving the first polymer that includes a cyclobutyl moiety. Upon contacting the fluorine containing polymer electrolyte membrane or solid, the fluoro-rubber solution is able to diffuse into the electrolyte membrane or solid. A blend composition can be obtained after removal of the solvent. The blend composition may be further heated to a temperature below the melting temperature of either component, or immersed in water at room temperature or elevated temperatures (in boiling water, for example) to facilitate the formation of a desired blend morphology for improved mechanical and/or electrochemical properties. Additionally, the first polymer that includes a cyclobutyl moiety and the fluoro-rubber may be blended through sequential polymerization of their corresponding monomers in the same reaction medium. The blend composition can also be obtained by mixing fine dispersions or emulsions of the corresponding fluoro-rubber and polymer electrolyte. The mixed dispersion or emulsion can be subsequently cast into a membrane or film of the blend composition.

Many organic and inorganic solvents may be used to dissolve, swell or disperse the first polymer that includes a cyclobutyl moiety and the fluoro-rubber. Non-limitation solvents may include tetrahydrofuran, methyl ethyl ketone, dimethylformamide, dimethylacetamide, tetramethyl urea, dimethylsulfoxide, trimethyl phosphate, and N-methylpyrrolidone. The above solvents may also be mixed with water, alcohols, esters or ethers to form mixed solvents. Certain latent solvents or swelling solvents may also be used. The latent solvents may include, but are not limited to, acetone, methyl isobutyl ketone, di-isobutyl ketone, glycerol ethers, glycerol ether esters, n-butyl acetate, cyclohexanone, diacetone alcohol, butyrolactone, isophorone, propylene carbonate, and dimethyl phthalate.

The ratio of first polymer that includes a cyclobutyl moiety to fluoro-rubber in the blend composition depends on the nature of the polymer electrolyte and the fluoro-rubber. For a blend composition with desirable mechanical and humidity stabilities, the fluoro-rubber may account for a significant portion or even majority portion of the blend composition. For a blend composition with desirable high ionic conductivity and moderate mechanical stability, the fluoro-rubber may account for a small to moderate portion of the blend. When the first polymer that includes a cyclobutyl moiety and Kynar Flex 2751 are mixed to form a blend composition, for example, an effectively high ionic conductivity can be achieved at Kynar Flex 2751 content between about 10% and about 50% by weight in the blend composition.

The blend composition may be formed into a membrane by any methods known to one of ordinary skill in the art. The membrane may be formed, for example, by melt casting, spin coating, solution casting, extrusion casting, calendaring, spray coating, blow molding, fixed gap coating, hot pressing and the like. The thickness of the film may be from a few micrometers to about 200 micrometers.

The membrane of the blend composition exhibits good mechanical and electrochemical stability under wide range of humidity conditions. The membrane typically has a controlled amount of swelling in boiling water. The amount of volume swelling (percentage increase in volume after a dry membrane is immersed in boiling water for about 1 hour) may range from about 10% to about 350%, or preferably from about 30% to about 200%. Swelling of a dry membrane in boiling water can also be measured by the percentage increase in membrane length. The electrolyte membrane of the blend composition also exhibits sufficient amount of elongation before break to accommodate the volume expansion or shrinking due to a large swing of relative humidity. The electrolyte membrane typically has an elongation at break greater than about 50%, or preferably greater than about 100%. The elongation at break is typically measured at room temperature and 50% relative humidity in the length direction of the membrane under tensile mode. The stability of the electrolyte membrane under wide range of different humidity conditions may be described by a humidity stability factor, Fx. Humidity stability factor (Fx) herein is referred to as the ratio of the percentage increase in length of a dry membrane after being immersed in boiling water for about 1 hour, to the percentage elongation at break of the dry membrane measured at room temperature at 50% relative humidity in the length direction under tensile mode. In general, the greater the humidity stability factor, the greater the stability of the electrolyte membrane under wide range of humidity conditions. The humidity stability factor of the electrolyte membrane is typically greater than 1.0. The electrolyte membrane with Fx greater than 5, or preferably greater than about 10 are also obtained.

The ion exchange capacity of the electrolyte membrane comprising the blend composition may range from about 0.01 to about 4 meq/gram, or preferably from 0.2 to about 3.0 meq/gram. The ionic conductivity of the electrolyte membrane may range from about 0.001 Siemen/cm to about 2 Siemen/cm depending on the relative humidity.

An anode and a cathode can be deposited or laminated to the opposite sides of the electrolyte membrane of the blend composition to form a membrane electrode assembly. The anode and cathode may comprise a conductive particle, a catalyst and optionally a polymer electrolyte. The conductive particle may include carbon black, Vulcan carbon (such as Vulcan XC-72), acetylene black, carbon nanotube, graphite, Black Pearls 2000, and Ketjen Black. The catalyst may include metal, metal alloy and metal oxides of platinum, ruthenium, and palladium. Any membrane electrode assembly manufacturing processes may be used to prepare the membrane electrode assembly.

In another embodiment of the present invention, a polymer blend is provided. The polymer blend includes an ionic polymer blend, which includes an ionic polymer having a cyclobutyl moiety and an ionic moiety that does not contain a cyclobutyl moiety. The polymer blend further comprises a non-ionic fluorine-containing polymer. The details of the ionic polymer having a cyclobutyl moiety are the same as those set forth above for the first polymer. Similarly, the details of the non-ionic fluorine-containing polymer are the same as those set forth above.

In a variation, the ionic moiety that does not contain a cyclobutyl moiety is chosen from polymers, oligomers or additives containing an aryl sulfonic acid moiety, an alkyl sulfonic acid moiety, a perfluorosulfonic acid moiety, a partially fluorinated sulfonic acid moiety or a phosphonic acid containing moiety, and mixtures thereof.

The following examples illustrate the various embodiments of the present invention. Those skilled in the art will recognize many variations that are within the spirit of the present invention and scope of the claims.

Example I

Mesitylene solutions of 6F (monomer, 40 g in 40 g mesitylene) and BPVE-oligomer (Mn=8,000, 80 g in 80 g mesitylene) are mixed together and degassed with Ar for about 1 hr at 60° C. The reaction mixture is then stirred (12 rpm) at 160° C. for 16 hours. The temperature is then raised to 180° C. and mesitylene is removed by distillation to leave a sticky solid. The residual solids are then heated as follows: 200° C. for 2 hours, 210° C. for 2 hours while continually stirring at 12 rpm, and finally 220° C. for 40 hours. (During this 40 hours, a timer is used to alternately switch the stirrer ON for 1 hour and OFF for 1 hour). All the reactions are carried out in a 1 L stainless steel reactor with mechanical stirring (stainless steel stirrer rod and stainless steel blades) and condenser. At the end of the reaction, the rigid polymer is cooled to 60° C. and completely dissolved in THF (480 g, 25 wt % solids) at 60° C. with increased stirring speed. The polymer solution in THF is filtered through a Teflon mesh filter cloth and precipitated by slowly pouring into methanol (4 L) while agitating with a glass rod. The cloudy methanol is decanted away and replaced with fresh methanol (2 L). This mixture is stirred and allowed to stand for 1 hour to remove any residual THF and low molecular weight oligomers trapped in the precipitated polymer. The methanol is decanted away and the polymer dried under vacuum at 60° C. (Batch ref: B86-241, Mn~38 K, 105 g, 88% yield).

Sulfonation of Fluorine Containing Block Copolymer to Form an Electrolyte.

A 1-liter flask is fitted with a mechanical stirrer, addition funnel and an argon inlet (for providing argon blanket inside the flask). The flask is placed in an oil bath maintained at about 40°-60° C. Argon flow is initiated and the flask is evacuated. 20.0 grams of block copolymer as represented by B86-241 are dissolved in 400 ml of methylene chloride under stirring to form a clear pale yellow solution at 40° C. Chlorosulfonic acid (40.0 g) is added using the addition funnel over a period of 2 minutes and the addition funnel is rinsed twice with 5-10 ml of methylene chloride. Upon addition of chlorosulfonic acid, the solution immediately turned purple and after ~45 minutes a gummy rubbery purple solid is formed. Stirring is continued for an additional 15 minutes. The purple gum is collected by decanting the sulfonating solution and rinsing the solids twice with 50 ml fresh methylene chloride. The purple solids are then dropped into 1 liter de-ionized water and a blender is used to chop the sulfonated polymer into a fibrous pale yellow solid in water. The sulfonated polymer is filtered and washed three times with 1 liter de-ionized water and dried under vacuum at 50° C. for 48 hours. The above process yielded 20.35 g (85.7%) sulfonated polymer electrolyte.

Membrane Preparation

A 10% by weight solution is prepared by dissolving 20 grams of the sulfonated polymer electrolyte in 180 grams of dimethylacetamide at 50° C. over a period of 2 hours. The solution is filtered through a 5 micron filter using high pressure.

A 20% by weight solution of Kynar Flex 2751-01 (a fluoro-rubber powder marketed by Arkema) is prepared by dissolving 20 grams of the rubber powder in 80 grams of dimethylacetamide and by rolling the mixture in a jar at room temperature overnight. The solution is used as prepared.

A solution of the blend composition is prepared by mixing the appropriate amounts of the corresponding sulfonated polymer electrolyte solution and the rubber solution as outlined in Table 1. Each of the solutions is rolled in a jar for a minimum of 1 hour to yield a fully mixed clear yellow solution. Portions of the solution are placed in a centrifuge operated at 3000 rpm for 5-10 minutes prior to coating to remove air bubbles.

TABLE 1

Mass of solutions used to prepare blend compositions

| | Percentage of Kynar Flex 2751-01 in the blend composition by weight | | | | |
|---|---|---|---|---|---|
| | 10% | 20% | 30% | 40% | 50% |
| Kynar Flex 2751 solution weight, gram | 1.66 | 3.31 | 4.97 | 6.62 | 4.79 |
| Sulfonated polymer solution weight, gram | 29.81 | 26.50 | 23.18 | 19.87 | 9.57 |

A sheet of windowpane glass cleaned using isopropanol and a clean wipe is placed on an Erichsen casting table at 25° C. The above solutions of the blend compositions are coated on the glass individually at a blade gap of 275 μm and a line draw speed of 12.5 mm/second. The table is heated to 80° C. and held there for 15-30 minutes. The glass plate is removed and left to stand at ambient temperature until cooled to touch. The membranes are floated off by placing the glass sheet in de-ionized water (>14 mΩ) and allowed to air dry for at least 1 hour at room temperature. The resulting membranes have a thickness of about 12 to about 26 micrometers based on the values from Table 3. The membranes are also visually clear, indicating uniform and intimate blending of the electrolyte and Kynar Flex materials. Each 25 cm×35 cm cast membrane is cut into 5 or 6 of 10 cm×10 cm membrane pieces for testing and characterization.

Ion Exchange Capacity (IEC)

The ion exchange capacity of the membranes is measured by recording the dry (ambient) weight of a membrane sample and displacing all available acidic protons in the membrane sample with sodium ion in a NaCl solution. The solution containing the displaced protons is then titrated with a 0.01 M NaOH to a pH of 7 using a pH meter and the measured IEC results are summarized in Table 2.

TABLE 2

Ion Exchange Capacity (meq H$^+$/g) of blended polyelectrolyte with Kynar Flex 2751

| | % of Kynar Flex in the membrane | | | | | |
|---|---|---|---|---|---|---|
| | 0% | 10% | 20% | 30% | 40% | 50% |
| IEC (meq/g) | 2.01 | 1.86 | 1.50 | 1.28 | 1.18 | 0.88 |

Water Uptake and Volume Swell (%) of the Membrane

Membrane dimensional change and volume swell (%) is measured by immersing the dry membrane in 100° C. boiling water for about one hour. Based on the dimensional changes in the x, y and z directions which represent the length, width and thickness, the volume swell is calculated. The length measurement is more accurate compared to the width and thickness measurements. The results of the measurements are summarized in Table 3.

TABLE 3

Boiling Water Uptake and Volume Swell

| Membrane Sample, % of Kynar Flex | Thickness (μm) | Weight Change | | | Dimension change | | | % Volume Swell |
|---|---|---|---|---|---|---|---|---|
| | | $w_i$ (mg) | $w_f$ (mg) | Δ% wt | % x | % y | % z | |
| 0% | 12 | 7.0 | 37.7 | 438 | 55.6 | 55.6 | 25.0 | 202.5 |
| 10% | 26 | 15.9 | 58.9 | 270 | 75.6 | 55.6 | 65.4 | 351.6 |
| 20% | 15 | 10.1 | 34.2 | 238 | 68.9 | 55.6 | 73.3 | 355.4 |
| 30% | 14 | 9.9 | 18.8 | 100 | 33.3 | 22.2 | 28.6 | 109.5 |
| 40% | 15 | 10.0 | 18.3 | 83 | 24.4 | 11.1 | 33.3 | 84.4 |
| 50% | 12 | 9.1 | 11.3 | 24 | 15.6 | 11.1 | 25.0 | 60.5 |

Mechanical Properties of the Membranes.

The tensile properties of the electrolyte membranes prepared in Table 1 are characterized using a MTS instrument. Stress strain curves of the membrane are obtained. The general shape of the stress strain curves of the membranes are similar. As the percentage of fluoro-rubber, Kynar Flex 2751, increases, the modulus and yield stress decrease while the elongation at break increases. The elongation at break and modulus are summarized in Table 4. As the content of Kynar Flex in the blend composition increases, the membrane exhibits greater elongation at break and lower modulus.

TABLE 4

Mechanical Properties of the Electrolyte Membranes

| Percentage of Kynar Flex in the membrane by weight | Elongation at break, % | Modulus, MPa |
|---|---|---|
| 0% | 12% | 1770 |
| 10% | 50% | 1730 |
| 20% | 100% | 1400 |
| 30% | 215% | 1360 |
| 40% | 265% | 1150 |
| 50% | 190% | 1010 |

Humidity Stability Factor, Fx

It is generally observed and believed that the mechanical durability of the electrolyte membrane is directly linked to the relationship of % dimensional change in the x direction (length direction) with elongation at break in the same direction. Membranes that swell more in the x direction than the elongation at break can potentially over-stress the membrane, leading to mechanical membrane failures. Humidity stability factor, Fx, is herein used to characterize the membrane durability in terms of its ability to withstand repeated humidity cycles. Fx can be calculated by the following equation, $$Fx = \frac{\% \text{ Strain at Break}(25° C., 50\% RH)}{\% \text{ Length Change}(100° C. \text{ H}_2\text{O})}$$

-continued where, $$\% \text{ Length Change} = \left(\frac{L_{wet} - L_{ini}}{L_{ini}}\right) \times 100\%$$

$L_{wet}$ is the length after being boiled in water and $L_{ini}$ is the initial membrane length before immersion in boiling water. Percent Length Change of the membrane samples is reported in Table 3 under dimension change in "% X" column. The Fx values of the electrolyte membranes are summarized in Table 5. As the percentage of Kynar Flex increases in the blend composition, the Fx value increases accordingly.

TABLE 5

Humidity Stability Factor Fx

| | Wt. % Of Kynar Flex | | | | | |
|---|---|---|---|---|---|---|
| | 0% | 10% | 20% | 30% | 40% | 50% |
| Fx | 0.22 | 0.66 | 1.45 | 6.46 | 10.86 | 12.18 |

Accelerated Mechanical Durability Under Humidity Cycles. (RH Cycling Between 0 and 150% RH (2 Min Dry/2 Min Wet at 80° C.)

The electrolyte membranes are cycled between 2 minutes at 0% relative humidity and 2 minutes at 150% relative humidity at 80° C. until a measured crossover leak of 10 cc/min is detected at a differential pressure of 3 psi. Number of cycles before failure are summarized in Table 6. As can be seen in the table, addition of Kynar Flex 2751 to the electrolyte membrane significantly improves the mechanical stability of the membrane with regard to humidity cycles. The results of such humidity cycle test in Table 6 also correlate very well with the corresponding humidity stability factor Fx in Table 5.

TABLE 6

Humidity Cycle Test Results.

| | Wt. % of Kynar Flex | | | | | |
|---|---|---|---|---|---|---|
| | 0% | 10% | 20% | 30% | 40% | 50% |
| # of Cycles to Failure. | <100 | ~300 | ~400 | ~300 | ~1300 | ~9000 |

Fuel Cells Made from the Electrolyte Membranes.

Figure 2:
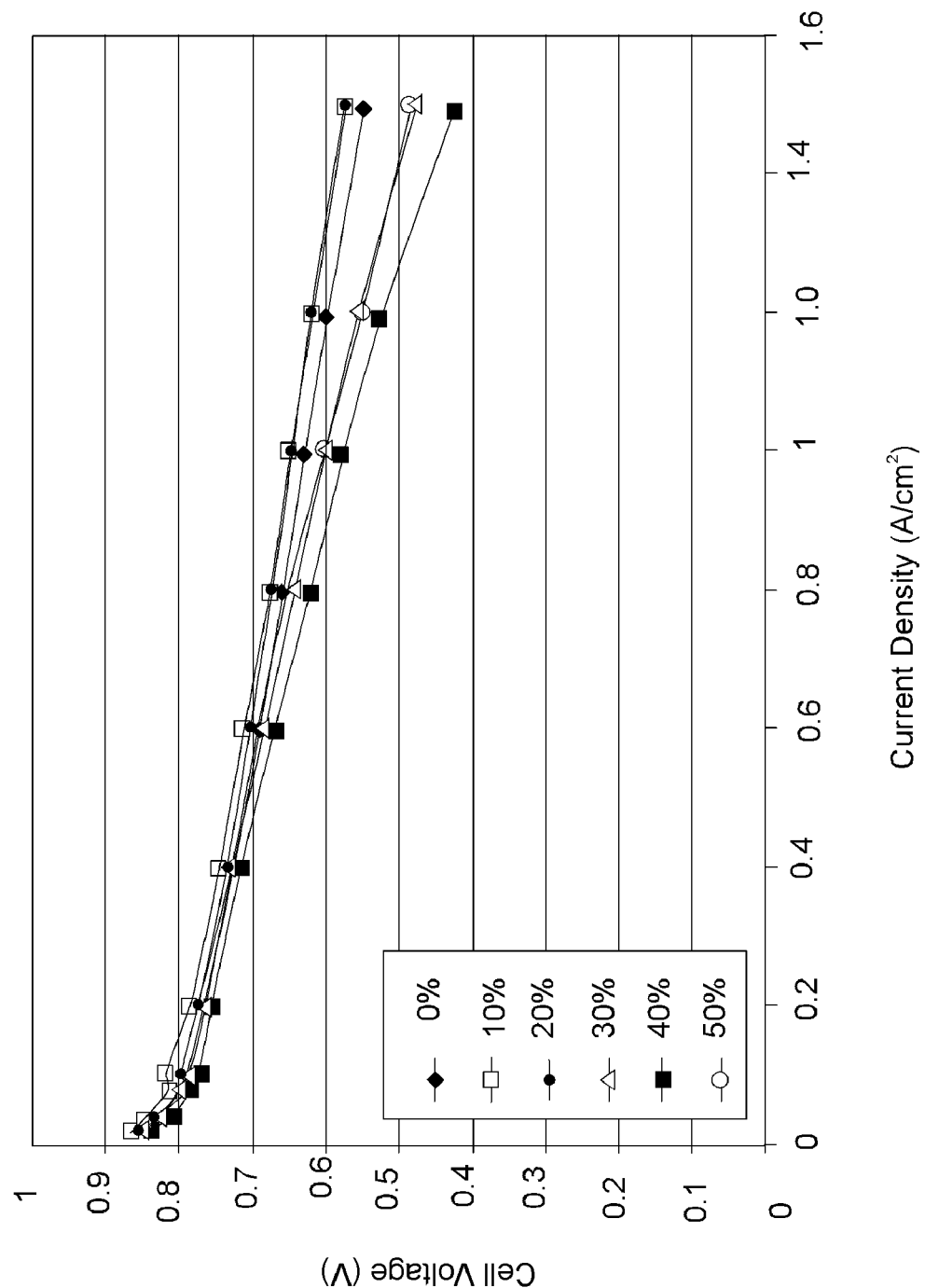
FIG. 2 shows the polarization curves of fuel cells constructed from several membranes comprising a polyperfluorocyclobutane block copolymer electrolyte and a fluoro-rubber, Kynar Flex 2751, at $RH_{out}$ of 85%.

A fuel cell with 50 cm² active area is constructed by sandwiching the electrolyte membrane with two CCDM's. The assembly is then further sandwiched between 2 bipolar plates. The cross-section of the fuel cell construction is similar to the fuel cell unit shown in FIG. 1. The CCDM is prepared according to the procedures described in U.S. Pat. No. 7,291,419. The CCDM includes about 0.4 mg/cm² mixed platinum catalyst on carbon (Tanaka) coating on the microporous layers of a SGL 25 BC carbon paper based anode and cathode. Pure hydrogen is used as the fuel gas and air is used as the oxidant gas. Both gases are humidified at 50% relative humidity. The gas input pressure ranges from 50 to 170 kiloPascal and the fuel cell is operated at 80° C. Polarization curves of each membrane at different $RH_{out}$ settings are obtained. $RH_{out}$ herein is referred to as both the anode and cathode RH(out) feedback from the test stand which varies from 150% to 63%. The polarization curves obtained at 85% $RH_{out}$ are shown in FIG. 2. The polarization curve records single unit fuel cell voltage as a function of current density. All the polarization curves show the similar trend of a decrease in voltage with an increase in current density. The degree or rate of voltage decrease with current density, however, varies depending on the membrane and $RH_{out}$. At a given current density, a higher fuel cell voltage would indicate a higher energy output and better fuel cell performance. Table 7 summarizes the fuel cell voltages at 1.0 A/cm² current density for different membranes at different $RH_{out}$.

TABLE 7

Fuel cell voltage at 1.0 A/cm² taken from the corresponding polarization curves.

| | Weight % of Kynar Flex in the Electrolyte Membrane | | | | | |
|---|---|---|---|---|---|---|
| $RH_{out}$ | 0% | 10% | 20% | 30% | 40% | 50% |
| 63% | 0.52 V | 0.50 V | 0.56 V | NM | NM | NM |
| 80% | 0.57 V | 0.61 V | 0.61 V | 0.56 V | 0.53 V | NM |
| 85% | 0.63 V | 0.65 V | 0.65 V | 0.60 V | 0.58 V | 0.60 V |
| 110% | 0.55 V | 0.62 V | 0.62 V | 0.59 V | 0.57 V | 0.61 V |

NM: not measured.

As shown in Table 7, the electrolyte membrane at 20% Kynar Flex has relatively high fuel cell voltages at all $RH_{out}$ test conditions. Surprisingly, electrolyte membrane containing about 50% Kynar Flex exhibits relatively high fuel cell voltage at high $RH_{out}$ conditions. Accordingly, incorporation of fluoro-rubber, such as Kynar Flex 2751, improves the durability and electrochemical performance of the electrolyte membrane and the fuel cell constructed from the membrane.

The above description of embodiments of the invention is merely exemplary in nature and, thus, variations thereof are not to be regarded as a departure from the spirit and scope of the invention.

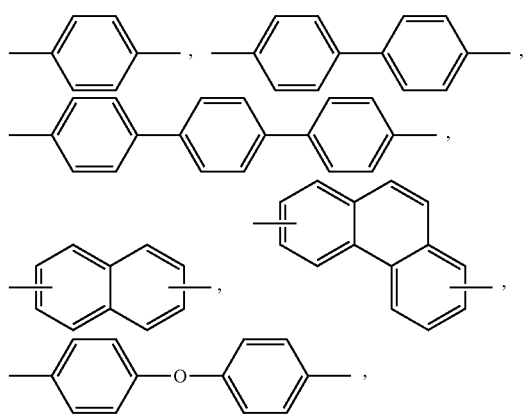

-continued
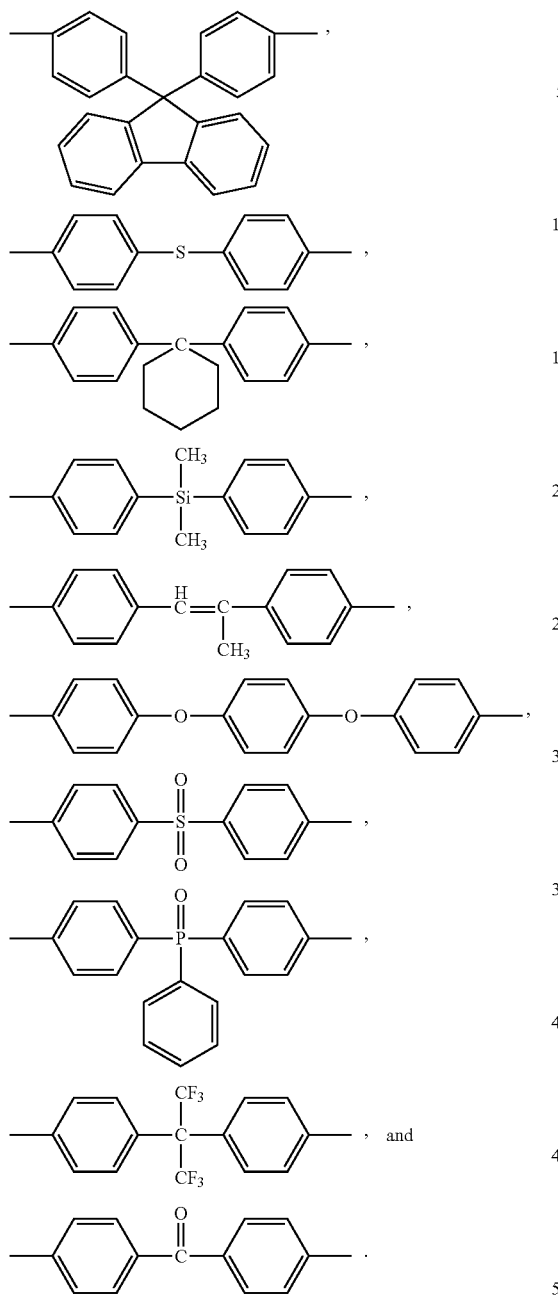
17. The polymer blend of claim 4 wherein d is equal to the number of aromatic rings in $E_1$.
18. The polymer blend of claim 4 wherein $E_1$ and $E_2$ each independently comprise a component selected from the group consisting of:
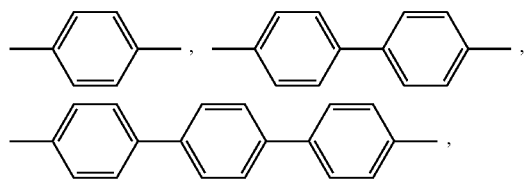
-continued
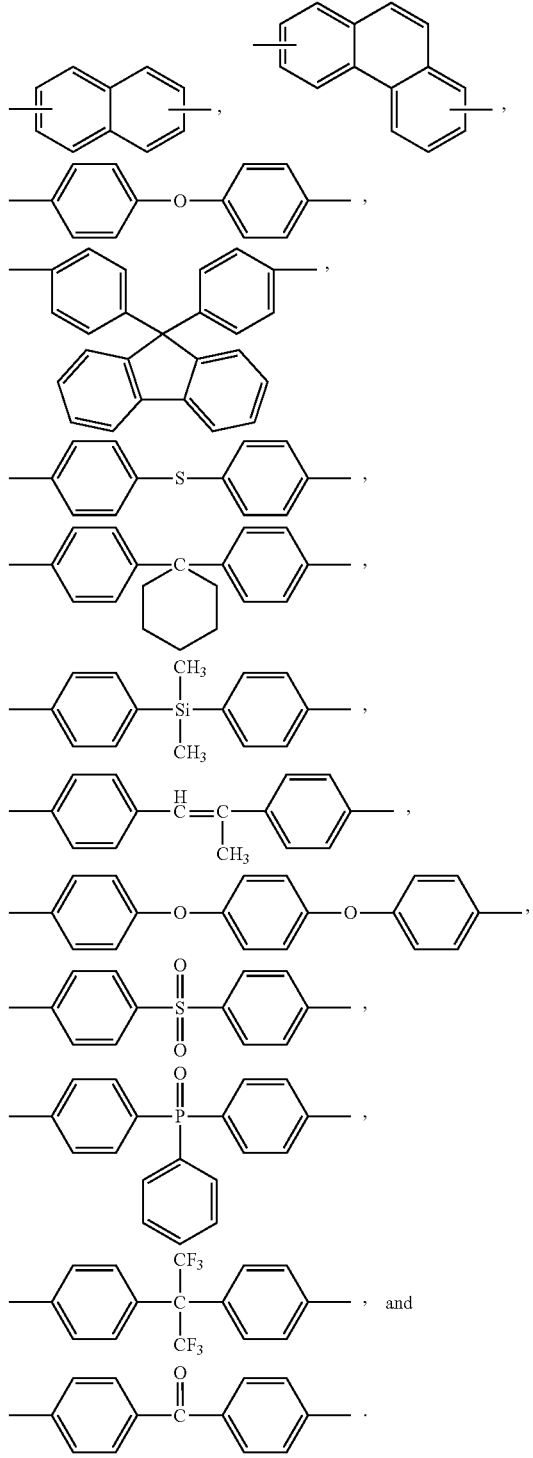
19. The polymer blend of claim 5 wherein $E_1$ and $E_2$ each independently comprise a component selected from the group consisting of:
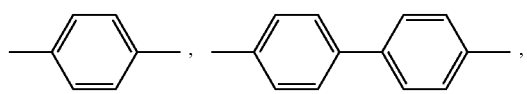

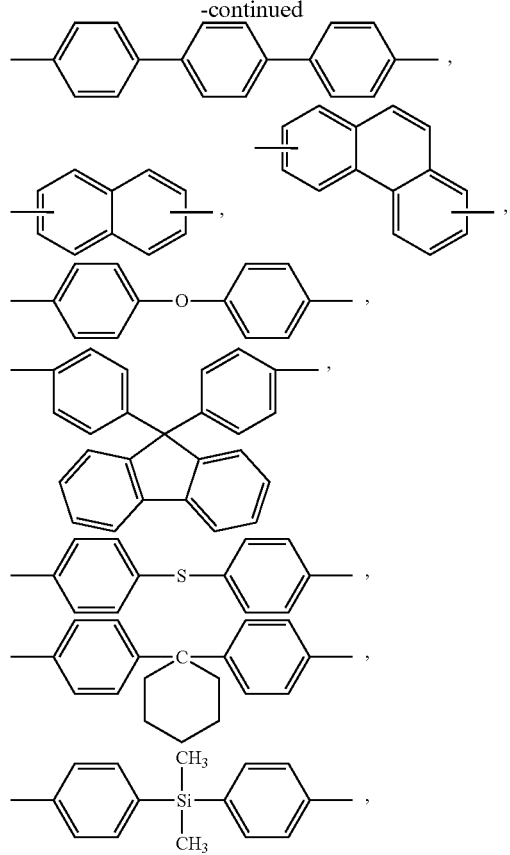
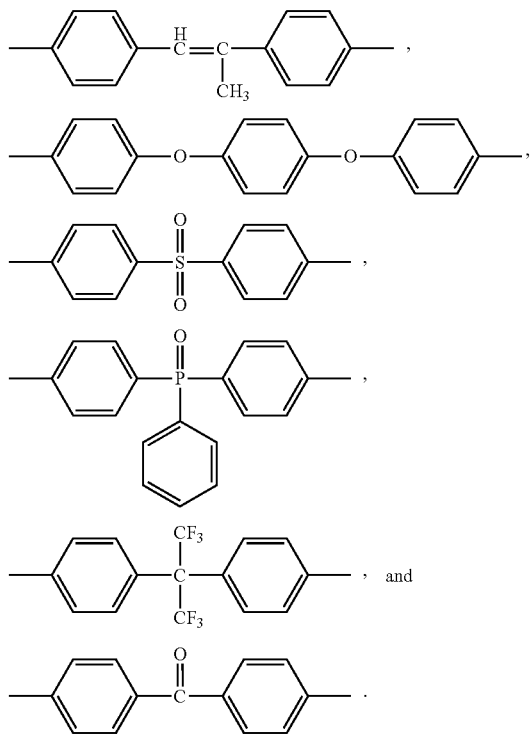

What is claimed is:

1. A polymer blend comprising:
   a first polymer comprising a cyclobutyl moiety wherein the cyclobutyl moiety is:

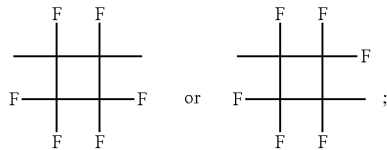

and a non-ionic fluorine containing polymer.

2. The polymer blend of claim 1 wherein the first polymer comprises polymer segments 1 and 2:

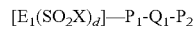

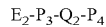

wherein:

$E_1(SO_2X)_d$ is a sulfonated aromatic containing moiety;

$E_1$ is an aromatic containing moiety;

$E_2$ is an unsulfonated aromatic-containing and/or aliphatic-containing moiety;

X is an —OH, a halogen, an ester, or

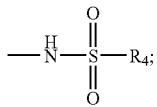

d is the number of $(SO_2X)_d$ attached to $E_1$;
$P_1$, $P_2$, $P_3$, $P_4$ are each independently: absent, —O—, —S—, —SO—, —CO—, —SO$_2$—, —NR$_1$H—, NR$_2$—, or —R$_3$—;
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety.

3. The polymer blend of claim 1 wherein the first polymer comprises segments 3 and 4:

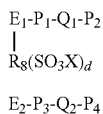

3

4 wherein:
$E_1$, $E_2$ are each independently an aromatic-containing and/or aliphatic-containing moiety;
X is an —OH, a halogen, an ester, or

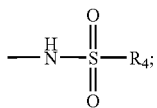

d is the number of $(SO_2X)_d$ attached to $E_1$;
$P_1$, $P_2$, $P_3$, $P_4$ are each independently: absent, —O—, —S—, —SO—, —CO—, —SO$_2$—, —NH—, NR$_2$—, or —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_8(SO_3X)_d$ is a sulfonated aliphatic or aromatic containing moiety; and
$Q_1$, $Q_2$ are each independently a fluorinated cyclobutyl moiety.

4. The polymer blend of claim 1 wherein the first polymer comprises segments 5 and 6:

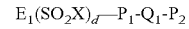 5

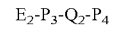 6 connected by a linking group $L_1$ to form polymer units 7 and 8:

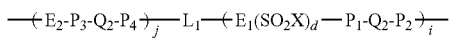 7

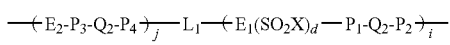 8 wherein:
$E_1(SO_2X)_d$ is a sulfonated aromatic-containing moiety;
$E_2$ is an unsulfonated aromatic-containing and/or aliphatic-containing moiety;
$L_1$ is a linking group;
X is an —OH, a halogen, an ester, or

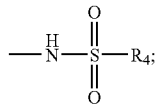

d is a number of $(SO_2X)$ functional groups attached to $E_1$ wherein d is an integer from 0 to 4;
$P_1$, $P_2$, $P_3$, $P_4$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing repetition of polymer segment 5; and,
j is a number representing repetition of a polymer segment 6.

5. The polymer blend of claim 1 wherein the first polymer comprises polymer segments 9 and 10:

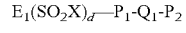 9

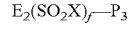 10 wherein:
$E_1$, $E_2$ are each independently an aromatic or aliphatic-containing moiety wherein at least one of $E_1$ and $E_2$ include an aromatic group substituted with —SO$_2$X;
X is an —OH, a halogen, an ester, or

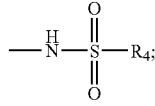

d is the number of $(SO_2X)$ functional groups attached to $E_1$ wherein d is an integer from 0 to 4;
f is the number of $(SO_2X)$ functional groups attached to $E_2$ wherein f is an integer from 0 to 4;
$P_1$, $P_2$, $P_3$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero d is zero.

6. The polymer blend of claim 1 where the first polymer includes one or more of the following protogenic functional groups: —SO$_3$H, COOH, PO$_3$R$_{12}$H, and combinations thereof, $R_{12}$ is H, aryl, phenyl, methyl, ethyl, propyl, butyl, and pentyl.

7. The polymer blend of claim 1 wherein the non-ionic fluorine containing polymer is selected from the group consisting of poly(tetrafluoroethlyene-co-ethylene), polyvinylidene difluoride, poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether.

8. The polymer blend of claim 1 wherein the non-ionic fluorine containing polymer comprises a copolymer of vinylidene fluoride and hexafluoropropylene.

9. A polymer blend comprising:
an ionic polymer blend comprising an ionic polymer having a cyclobutyl moiety and an ionic moiety that does not contain a cyclobutyl moiety wherein the cyclobutyl moiety is:

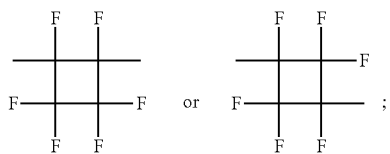

and
a non-ionic fluorine containing polymer.

10. The polymer blend of claim 9 wherein the ionic moiety that does not contain a cyclobutyl moiety is selected from the group consisting of polymers, oligomers or additives containing an aryl sulfonic acid moiety, an alkyl sulfonic acid moiety, a perfluorosulfonic acid moiety, a partially fluorinated sulfonic acid moiety or a phosphonic acid containing moiety, and mixtures thereof.

11. The polymer blend of claim 2 wherein d is equal to the number of aromatic rings in $E_1$.

12. The polymer blend of claim 2 wherein d is an integer from 0 to 4.

13. The polymer blend of claim 12 wherein $E_1$ comprises a component selected from the group consisting of:

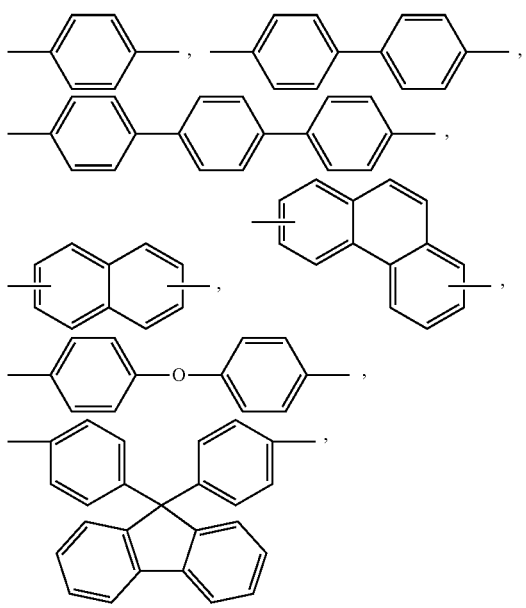

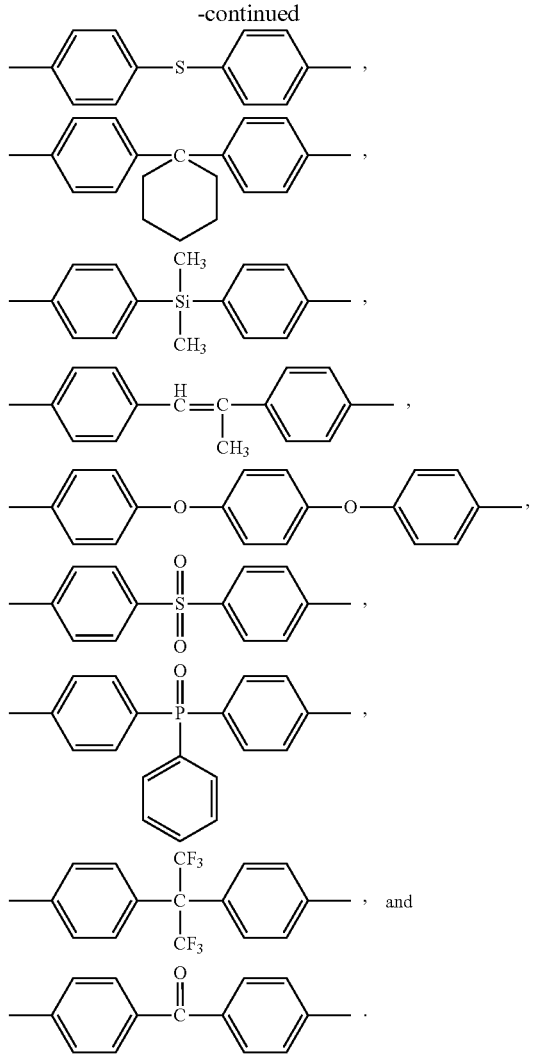

14. The polymer blend of claim 3 wherein d is equal to the number of aromatic rings in $E_1$.

15. The polymer blend of claim 3 wherein d is an integer from 0 to 4.

16. The polymer blend of claim 15 wherein $E_1$ comprises a component selected from the group consisting of: